United States Patent [19]
Rush

[11] Patent Number: 5,208,100
[45] Date of Patent: May 4, 1993

[54] ARTICLE WITH ANTIQUE APPEARANCE AND METHOD OF MAKING SAME

[76] Inventor: Victoria L. Rush, 5088 Wallace Rd., St. Paris, Ohio 43072

[21] Appl. No.: 747,603

[22] Filed: Aug. 20, 1991

[51] Int. Cl.⁵ .............................................. B32B 23/08
[52] U.S. Cl. ................................... 428/332; 428/511; 428/522; 428/537.1; 427/411; 427/412; 427/414; 427/407.1; 427/408; 106/137
[58] Field of Search ............... 106/123; 428/522, 332, 428/511, 537.1; 427/414, 407.1, 408, 411, 412

[56] References Cited

U.S. PATENT DOCUMENTS 3,619,222 11/1971 Werle .................................. 428/355
5,098,962 3/1992 Bozich ................................ 428/481

*Primary Examiner*—Edith Buffalow
*Attorney, Agent, or Firm*—Marshall & Melhorn

[57] ABSTRACT

An article having a base, a base coating adhered to the base, the base coating being formed from a base coating composition having, in approximate volume, the following ingredients:

| Ingredients | Volume |
| --- | --- |
| Hide glue | 14–34 |
| Colorant | 0.1–2 | and an acrylic polymer paint coating adhered to the base coating, the acrylic coating having checks to provide an antique appearance.

17 Claims, No Drawings

ARTICLE WITH ANTIQUE APPEARANCE AND METHOD OF MAKING SAME

The present invention relates to an article having an antique appearance, the article having a base coating made from a composition containing hide glue and a colorant, and an acrylic polymer paint coating over the base coating that has checks and other surface defects to provide the article with an antique appearance.

BACKGROUND AND OBJECTS OF THE INVENTION

It is desired to make an article with an antique appearance using a base coating of hide glue and a relatively large amount of colorant and an acrylic paint coating over the base coating that, when dried, has checks to provide an antique appearance.

It is, therefore, an object of the invention to provide an article with an antique appearance and a method of making the article in which a base coating containing hide glue and colorant is coated on the article base and, therefore, an acrylic paint coating over the base coating, the base coating having sufficient thickness to penetrate into the article base and the base coating having sufficient thinness to provide checks in the acrylic overcoating.

It is an object of the present invention to provide an article having a base, a base coating adhered to the base, the base coating being formed from a base coating composition comprising, in approximate volume, the following ingredients:

| Ingredients | Volume |
|---|---|
| Hide glue | 14–34 |
| Colorant | 0.1–2 | and an acrylic polymer paint coating adhered to the base coating, the acrylic coating having checks to provide an antique appearance.

These and other objects will be apparent from the specification that follows and the claims.

SUMMARY AND DETAILED DESCRIPTION

The present invention provides an article having a base, a base coating adhered to the base, the base coating being formed from a base coating composition comprising, in approximate volume, the following ingredients:

| Ingredients | Volume |
|---|---|
| Hide glue | 14–34 |
| Colorant | 0.1–2 | and an acrylic polymer paint coating adhered to the base coating, the acrylic coating having checks to provide an antique appearance.

The present invention also provides a method of making the above-described article, the base coating steep being such that the deposited base coating is of a thickness sufficient to penetrate, at least slightly, the base and also having a thinness sufficient to cause a plurality of small checks in the subsequently formed acrylic paint coating to thereby provide the article with a desired old, weathered, antique look.

The thickness of the base coating layer is generally about ½ or 1 mil up to 10 or 12 mils and preferably about 2 to 8 mils. The thickness of the acrylic coating is about the same as the base coating or about ½ to 12 mils and, preferably, 1 to 5 mils.

The base is preferably wood although suitable article bases also are fiberboard, wallboard, cardboard, canvas and other easily shaped and decorated materials.

The base coating composition preferably has about 22 to 26 volumes of hide glue and about 0.3 to 1 volume of colorant.

Optionally, water can be used with the hide glue and colorant as follows:

| Ingredients | Volume Range General | Preferred |
|---|---|---|
| Hide glue | 14–34 | 22–26 |
| Water | 1–9 | 4–6 |
| Ink (colorant) | 0.1–2 | 0.5–1.5 |

A preferred base coating composition with water is as follows:

| Ingredients | Volume |
|---|---|
| Hide glue | 24 |
| Water | 5 |
| Ink (colorant) | 1 |

The acrylic polymer paint coating is known in the art. A suitable acrylic coating composition is Delta Acrylic Paint, Delta Technical Coating, Inc., Whittier, Ca. Acrylics include polymethylmethacrylate, polyethylmethacrylate, polymethylethacrylate and polyacrylic acid as set forth, for instance, in Modern Plastics Encyclopedia, 1981–82, pages 9–10.

Generally, the acrylic coating composition comprise a short chain, further polymerizable, curable acrylic polymer in a solvent such as styrene or other copolymerizable monomers that also provide crosslinking in the resultant polymer. Suitable pigments, stabilizers, catalysts and additives may be used as is known.

Suitable hide glues, that are impure gelatin solutions, are those obtained from boiling animal hides. Hide glues are disclosed, for instance, in U.S. Pat. No. 2,513,121. Hide glues often have a pH of about 5.8 to 7.4, the glues in solution in water, and the glue may range from about one part glue to one part water to about one part glue to 3 or 4 parts water. The percent by weight of glue solids can be from about 5 to 50%.

A suitable hide glue can be obtained from Franklin Hide Glue, Franklin International, Columbus, Oh.

A suitable colorant is a black ink containing carbon black, shellac, borax and water. A suitable black ink, Black Ink No. 416, can be obtained as Carter's Ink, Black No. 416, from the Dennison Manufacturing Company, Framingham, Ma.

When an ink is used as the colorant, the pigment, (preferably carbon black) is about 10 to 50 or 60 pars by volume of the aqueous ink solution. In general, the pigment is about 5 to 10 up to 50 or 60 weight percent of the aqueous ink composition. As is known, other ink ingredients such as borax and shellac can be used.

The colorant and hide glue can be mixed just prior to coating the base with the base coating composition, or the colorant, and hide glue can be premixed and stored, for some time, before coating.

The colorant can be an inorganic or organic pigment or dye. The colorant can be dry or liquid and is preferably water soluble and compatible with water and the hide glue. Suitable colorants are carbon black, bone black, iron oxide, titanium dioxide, aniline black, ultramarine blue, zinc oxide and other metallic pigments, such as aluminum and bronze powders. As is known, pigments often generally have an average particle size of about 0.01 to 1 micros.

Colorants and pigments are known in the art and disclosed, for instance, in Modern Plastics Encyclopedia, 1981-82, pages 146-166.

As preferably described, the amount of colorant used is relatively high for the superior results of good base coloring and the formation of many fine checks in the overcoating. The high amount of colorant, 0.7 to 2 volumes per 14 to 34 volumes of hide glue, is many times (preferably at least 20 to 30 times) higher than the amount of colorant in any previous use (1 part of colorant (inf) per 700 parts of volume of hide glue.

The thickness of the base is not critical and generally is about 1/16 inch to ¼ or ½ inch.

What is claimed is:

1. An article having a base, a base coating adhered to the base, the base coating being formed from a base coating composition comprising, in approximate volume, the following ingredients:

| Ingredients | Volume |
| --- | --- |
| Hide glue | 14-34 |
| Colorant | 0.1-2 | and an acrylic polymer paint coating adhered to the base coating, the acrylic coating having checks to provide an antique appearance.

2. An article as defined in claim 1 in which the base coating composition comprises about 22 to 26 volumes of hide glue and 0.3 to 1 volume of colorant.

3. An article as defined in claim 1 in which the base coating composition is about 24 volumes hide glue and 0.5 to 1.5 volumes of colorant.

4. An article as defined in claim 1 in which the base coating composition has the following formulation:

| Ingredients | Volume |
| --- | --- |
| Hide glue | 24 |
| Water | 5 |
| Ink (colorant) | 1 |

5. An article as defined in claim 1 in which the base coating composition has the following formulation:

| Ingredients | Volume |
| --- | --- |
| Hide glue | 14-34 |
| Water | 1-9 |
| Ink (colorant) | 0.1-2 |

6. An article as defined in claim 1 in which the base coating composition contains about 4 to 6 volumes of water.

7. An article as defined in claim 1 in which the thickness of the base coating is about ½ to 10 mils, and the thickness of the acrylic coating is about ½ to 10 mils.

8. A process for making an article with an antique appearance, the process comprising the steps of:
A. coating a base of an article with a base coating composition comprising, in approximate volume, the following ingredients:

| Ingredients | Volume |
| --- | --- |
| Hide glue | 14-34 |
| Colorant | 0.1-2; and |

B. coating the base coating with an acrylic polymer coating that, when dried, has checks to provide an outer coating of the article with an antique appearance.

9. A method as defined in claim 8 in which the base coating composition comprises about 22 to 26 volumes of hide glue and about 0.3 to 1 volume of colorant.

10. A method as defined in claim 8 in which the base coating composition comprises about 24 volume of hide glue and 1 volume of colorant.

11. A method as defined in claim 8 in which the base coating composition has the following formulation:

| Ingredients | Volume |
| --- | --- |
| Hide glue | 24 |
| Water | 5 |
| Ink (colorant) | 1 |

12. A method as defined in claim 8 in which the base coating composition has the following formulation:

| Ingredients | Volume |
| --- | --- |
| Hide glue | 14-34 |
| Water | 1-9 |
| Ink (colorant) | 0.1-2 |

13. A method as defined in claim 8 in which the base coating composition contains about 4 to 6 volumes of water.

14. A method as defined in claim 8 in which the base step (A) provides the base coating with sufficient thickness to penetrate into the base and yet have sufficient thinness to provide a plurality of cracks in the resultant acrylic layer to provide the article with an antique appearance.

15. An article as defined in claim 5 in which the ink is black ink.

16. A process as defined inn claim 12 in which the ink is black ink.

17. An article consisting essentially of a base, a base coating, and an acrylic coating over the base coating and adhered to the base coating, the base coating being formed from a base coating composition consisting essentially of, in approximate volume, the following ingredients:

| Ingredients | Volume |
| --- | --- |
| Hide glue | 14-34 |
| Water | 1-9 |
| Colorant | 0.1-2 | the acrylic coating having checks that, in combination with the colorant of the base coating, provide the article with an antique appearance.

* * * * *